Feb. 5, 1935.                E. J. PERRY                1,990,049
                             INSECT TRAP
                          Filed Oct. 5, 1933
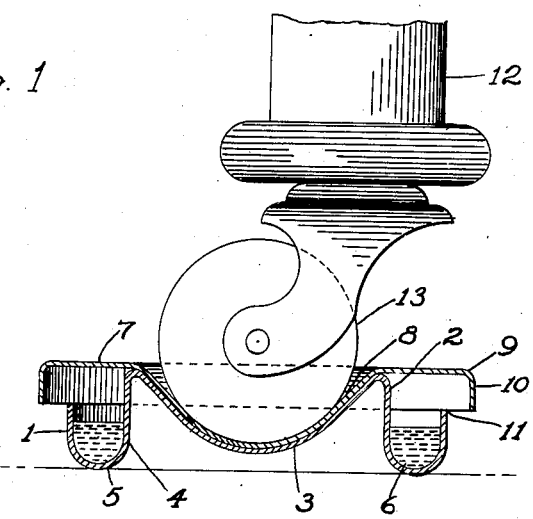
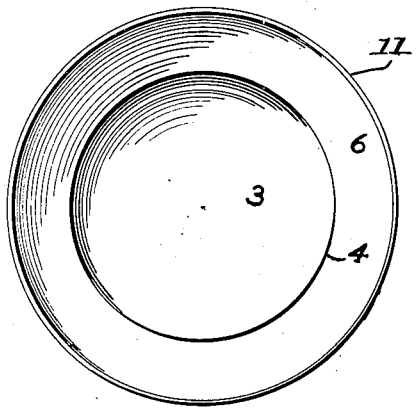   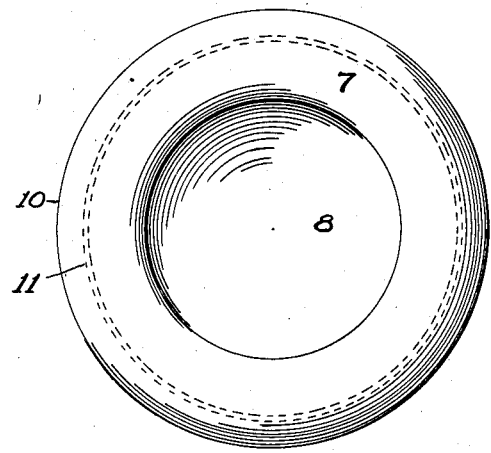
Inventor
Edgar J. Perry
By   Percy H Moore
                Attorney Patented Feb. 5, 1935

1,990,049

UNITED STATES PATENT OFFICE 1,990,049

INSECT TRAP

Edgar J. Perry, Pierre, S. Dak.

Application October 5, 1933, Serial No. 692,324

1 Claim. (Cl. 43—109)

My invention relates to insect traps and more particularly to that class of traps designed to prevent insects such as ants or bed bugs from crawling up the posts or legs of beds, tables etc.

The general object of the invention is to provide a trap of simple economical construction which is adapted to hold a poisonous liquid through which the insects must travel to reach the bed post.

Other objects and advantages will be apparent from the following specification considered with the accompanying drawing, in which:

Fig. 1 is a vertical section of the insect trap with a caster positioned therein;

Fig. 2 is a top plan view of the trap with the cover removed; and,

Fig. 3 is a top plan view of the same.

Referring more particularly to the drawing 1 denotes my improved trap or receptacle comprising a dish like base member 2 preferably of relatively thin metal pressed or otherwise formed to the desired shape. The concave body portion 3 of base 2 is formed with a depending U-shaped peripheral flange 4, which curves outwardly and thence upwardly to form a rounded floor engaging surface 5, and an annular trough 6 respectively. This trough is designed for containing any suitable poisonous liquid having a deadly effect upon ants and bed bugs when eaten or taken up by these pests.

Superposed upon the base 2 is a reinforcing cover member 7, which is formed with a centrally depending dished portion 8 which snugly seats within the correspondingly shaped body portion 3 of said base. The rim portion 9 of cover 7 is formed with an annular depending flange 10, which in addition to strengthening the cover for a purpose presently explained, serves as a guard to prevent children from reaching the contents of trough 6. It will be noted that the lower edge of flange 10 terminates in a horizontal plane coincident with or slightly below the upper 11 edge of U-shaped flange 4.

When the trap or receptacle 1 is placed beneath the post 12 of a bed, with the caster 13, supported within the dished portion 8 of the cover, the latter will be securely clamped against accidental displacement. Furthermore, both the cover member 7 and base member 2 will be prevented from buckling under the weight of the bed by the reinforcing action of flange 10, thus permitting these parts to be made of relatively thin inexpensive metal. The caster readily seats and centers itself in the concave portion of the receptacle and consequently will be securely held against independent movement with respect to the receptacle.

It should be noted the bottom of the caster rest or concave body portion 3 is elevated slightly above the rounded floor engaging portion 5, and consequently does not rest on the floor and create an objectionable high center. If portion 3 were level with the portion 5, unevenness in the floor would allow the bed or other article supported by the receptacle 1 to rock, and thus mar the polished surface of the floor.

Having thus described my invention, what I claim is:

A poison receptacle comprising a base having a depending rounded portion, said body having an integral downwardly bent portion terminating in an annular trough, the bottom of said trough being in a plane below that of the said depending rounded portion, and a cover having a central depending rounded portion seating in said first mentioned depending rounded portion and in which a caster may be seated and also being provided with a horizontally disposed flanged portion surrounding and guarding said annular trough, said flanged portion contacting with and directly supported by the said downwardly bent portion.

EDGAR J. PERRY.